Aug. 6, 1968     T. F. GILL     3,395,788
LURE CONTAINER WITH SELF-CONTAINED TENSION RETAINED CLOSURE
Filed April 17, 1967
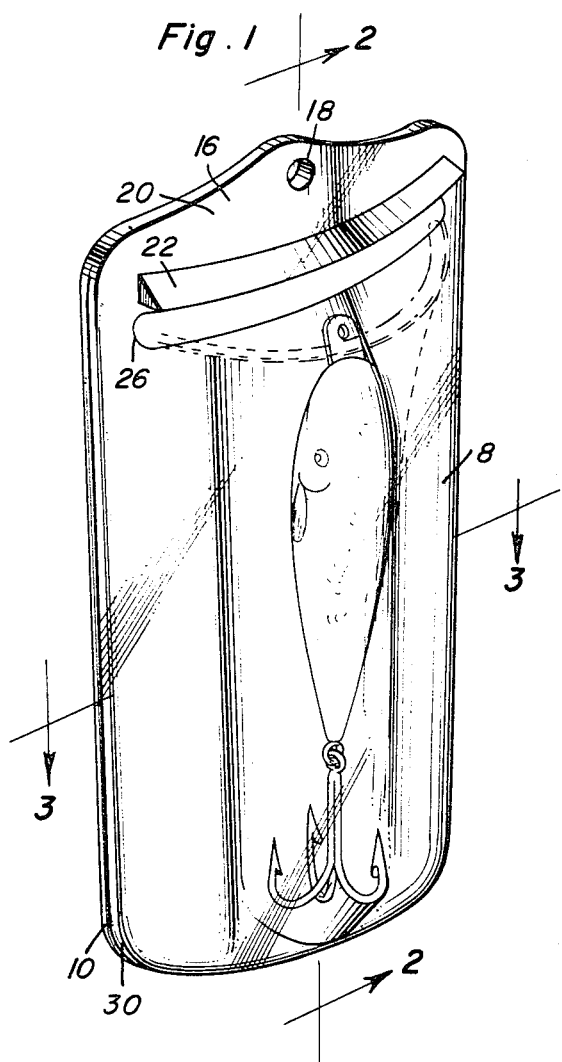
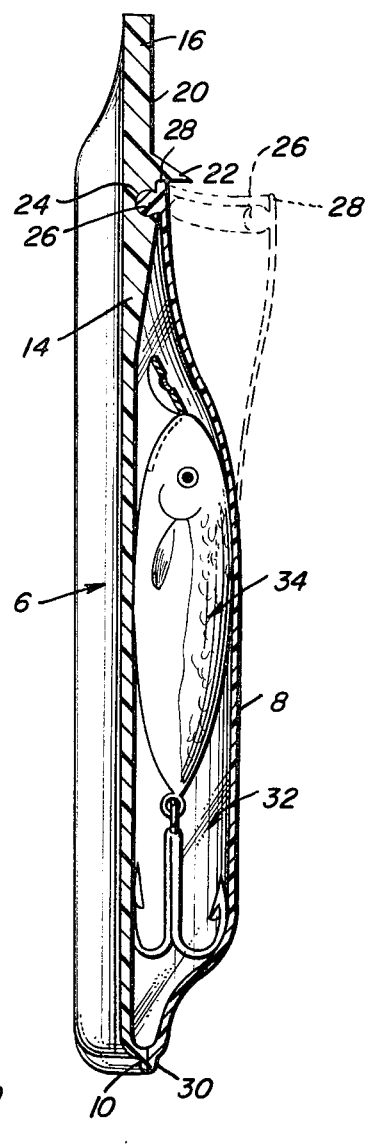
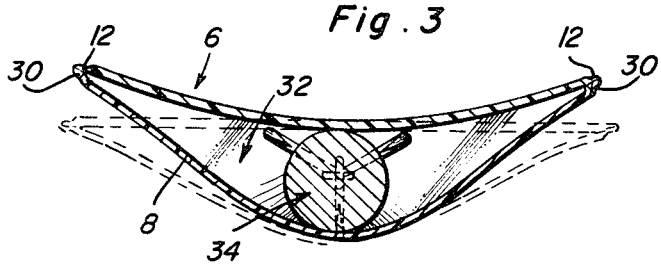
Truman F. Gill
INVENTOR.
BY Clarence A. O'Brien
and Harvey B. Jacobson
Attorneys United States Patent Office 3,395,788
Patented Aug. 6, 1968

3,395,788
LURE CONTAINER WITH SELF-CONTAINED
TENSION RETAINED CLOSURE
Truman F. Gill, P.O. Box 909, Beeville, Tex. 78102
Filed Apr. 17, 1967, Ser. No. 631,261
6 Claims. (Cl. 206—45.34)

ABSTRACT OF THE DISCLOSURE

A pocket-size transparent envelope-type container provides a pouch for artificial lures and bait. It serves as (1) a manufacturer's special article (lure) package (2) a tackle store's lure display and safe merchandising packet and (3) as a multipurpose lure and container for anglers. The angler can carry it uncluttered in his tackle box or shirt pocket. It embodies a unique self-contained tension retained closure which seals itself, is contoured to fit the shirt pocket, and springs open when squeezed. Also, it is provided above the entrance-exit with a water deflector.

Background of the invention

This invention relates, broadly classified, to special article packages and containers and has to do with certain new and useful improvements in a pocket-size transparent puncture-resistant plastic container for artificial bait such as jigs, metal squids, flies, plugs and hook-equipped lures in general.

More specifically, the instant concept pertains to a container characterized by a unique pouch or pocket with a lure (or lures) therein and which is such in structural design and capability that it will serve the mass production procedures and economies of manufacturers, will justify unqualified endorsement and approval by wholesalers and retailers and, what is more important, will advantageously serve the needs of fishermen who surf fish, wade fish or fish in places where carrying a tackle box uusally tries the patience and presents perplexing difficulties. Keeping in mind that artificial baits are invariably equipped with dangerous and troublesome hooks and often result in entangled tackle boxes, the objectives of the present trouble-free container and carrier will be more fully appreciated and understood.

The herein disclosed lure containing package fits well into the lower part of a tackle box and can be handled much more easily than lures which are kept in troublesome plastic or cardboard tubes and boxes inasmuch as there are no lids or caps to contend with. The manufacturer can insert a lure in each new container or package for expedient handling and shipping. Crates of his thus packed lures will not be as bulky and in most situations not as expensive as lures packed in cardboard and plastic boxes. The store owner can effectually display and retail each purchase in a retainable and ever-useful pouch or pocket-type transparent container. The prospective customer can see and amply examine the lures which he is about to buy, and before selecting it he can handle it without fear of getting snagged. Also, because the upper end of the back wall is apertured and fashioned into a flap, the thus enclosed lure can be safely but accessibly hung on a wallboard suspension hook. When the fisherman has his packaged bait in the tackle box, it is ready for use and can be handled safely—even by inexperienced anglers and children who may, as is often the case, be on hand. It follows that the invention serves its intended purposes ranging from the factory to the angler's favorite fishing spot.

Prior art

Others engaged in the field of invention under advisement have attempted to aptly cope with the problem of encasing and storing hook-equipped artificial bait. The use for example, of a transparent envelope with a pocket or pouch and a closure flap—broadly analogous—to the present invention is shown in the artificial fly envelope in a patent to Cooper 915,557 and which is limited to carrying snelled flies and is unsuitable for maintaining and carrying lures, spoons, flies, jigs, and metal squids as is the invention herein revealed. For additional background and information the reader may also desire to acquaint himself with the artificial bait holder shown in the patent to Hughes 1,788,674 and directed, unlike the present invention, to a bait holder and drier characterized by a single sheet of transparent material doubled upon itself into an open-ended container resembling a sleeve, oval in cross-section, and means for fastening overlapping lengthwise edges together. The artificial bait packaging, storing and handling problem involves many facets and, as will be hereinafter more fully understood, the present invention offers all concerned a versatile adaptation which may be justly considered as an acceptable solution of the over-all problem.

Summary

Briefly, the present improvement has to do with a multipurpose artificial lure container which comprises a vertically elongated self-shape-retaining back wall which is arcuate, concavo-convex, constantly tensioned and conformingly adapts itself for insertion and convenient retention in the user's shirt pocket and has a self-adapting flexibly pliant front wall marginally joined to coacting marginal edges of the back wall. These walls are made of tough transparent plastic material requisite tension held properties and the upper portion of the front wall terminates below the corresponding upper part of the back wall and has a lip which defines the openable mouth of a lure pocketing pouch. This lip is yieldingly elastic and provided with a permanently curved or arcuate retaining rib which is self-tensioned and snaps into an aligned arcuate keeper groove on the back wall, thus providing a unique self-contained tension retained closure. This closure is normally closed and automatically provides a sealable mouth. The enclosed bait is accessible and can be safely and easily shunted or funneled out for use merely by manually pressing or forcibly squeezing the vertical edges of the back wall in a manner to buckle and flatten out said back wall, whereupon the rib is withdrawn from the groove and the mouth pops open. When the gripping pressure is intentionally released, the mouth snaps closed again and this action occurs whether or not the lure is enclosed.

These together with other objects and advantages which will become subsequently apparent reside in the details of construction and operation as more fully hereinafter described and claimed, reference being had to the accompanying drawings forming a part hereof, wherein like numerals refer to like parts throughout.

Brief description of the drawing

FIG. 1 is a view in perspective of the improved container with the self-contained tension retained closure means and wherein the mouth thereof is closed in full lines and shown open in phantom lines and wherein a typical lure is pocketed therein.

FIG. 2 is a view on an enlarged scale taken centrally on the plane of the section line 2—2 of FIG. 1.

And FIG. 3 is a cross-section on the horizontal section line 3—3 of FIG. 1 and which shows the normal position and relationship of the walls in full lines and the expanded or flattened position in phantom lines.

Description of the preferred embodiment

By way of introduction to the description of the details it is to be pointed out that unlike the aforementioned artificial fly envelope shown in the Cooper Patent 915,557, the present lure container with its unique tension-held closure means is expressly designed and adapted to accommodate any and all commonly sold and used artificial bait and lures, including spoons, flies, jigs, metal squids, plugs and the like. The artificial bait, a single one of which is here shown is confined within the pouch or pocket portion of the envelope-like container, not in the mouth, but is readily accessible and safely dischargeable for use merely by pressing the tension closure means from a normal closed to an open position as shown in phantom lines in FIGS. 2 and 3. Once the pressure from the sides is released, the tension closure automatically forms a semi-seal. This takes place automatically whether or not a lure is enclosed.

It is further pointed out by way of introduction, that along the Gulf Coast from Florida to Texas anglers enjoy much cotton shirt fishing weather. It is often too hot to wear jackets and sometime too hot to wear waders while wading or surf fishing. It follows that the wade fisherman has only his pockets in which to carry his gear. Because the lure container herein disclosed is provided with tension-held closure means and is formed on a reverse arch principle, the back side or wall of the container fits the contour of the body and is less bulky. Then, too, and since most fishermen will no doubt place more than one lure in each container, although it is designed as a merchandising container for only one, he can carry more than twice as many lures in one regular shirt pocket with less bulk to interfere with his fishing.

As shown, the container, whether construed as a storing and carrying holder, or as a package for use by the manufacturer, retailer and others is characterized by two walls, that is, a back substantially rectangular and vertically elongated rear wall 6 and a companion or complemental front wall 8. The back wall is of the shape-conforming curvature shown in FIG. 3 and is referred to as concavo-convex. The character of the transparent plastic material used is such that this wall is firm and self-shape-sustaining. There is a lower marginal lip or flange as denoted at 10 in FIG. 2 and similar tapered or appropriately feathered vertical side flanges 12 as shown in FIG. 3. Near the upper end the thickness of the plastic wall is gradually increased and rigidified as at 14 and merges with a relatively rigid upper end portion 16 provided with an opening 18 properly centered and which can be used to provide a suspension flap when for example the device is being displayed in a tackle store for sale. The front surface portion 20 is provided with an arcuate horizontally disposed flange 22 which is V-shaped and which is located above a substantially semi-circular or equivalent groove 24. This groove provides an oriented keeper or keying channel for a correspondingly shaped keying or retaining rib 26 which is extended across the major upper portion of the upper lip-like edge 28 of the flexible and pliant front wall 8. The horizontal and vertical marginal edge portions 30 of the front wall are opposed to and appropriately joined in fluid-tight relationship with the aforementioned marginal flanges 10 and 12 on the back wall. The fullness and pliancy of the front wall defines the aforementioned pocketing pouch 32 for the insertable and removable hook-equipped artificial bait 34. The inherent resiliency of the lip 28, which defines the openable and closable mouth, in conjunction with the self-shaping and retaining properties of the rib or tongue 26 is such that the tongue or rib is normally seated in the groove 24 as shown in FIG. 2. With this construction and arrangement and after insepcting and choosing the package or container-held lure the angler can arch his hand across the back wall and place the thumb and fingers on the marginal edges and squeeze to overcome the inherent self-curving tension of the back wall 12 resulting in the mouth of the container popping open. Then when released the tension of the ribbed mouth will cause the mouth to automatically close. When the mouth of the pouch is thus sprung open all that is necessary is to invert the pouch and to shake the bait out. There is no lid to close, or snap fasteners or the like to cope with. Also there is no bulkiness to contend with should the angler desire to carry the bait pocketed container in his shirt pocket or, for that matter, in any other garment pockets, tackle box or the like.

Although the lure container disclosed was originally designed to accommodate and package but a single lure, it can be used by fishermen to carry more, the number depending upon the size, shapes of hooks and varying types of bait bodies.

The container herein shown and described is designed and adapted to function as a manufacturer's shipping package with ample space on the walls for advertisements and instructions for handling and use, a tackle store's merchandising package with a punched hole for display suspension, and a safe and convenient package for the angler or other purchaser. It follows, too, that it constitutes an innovation which serves the ordinary or expected purposes of all persons concerned therewith.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use as a manufacturer's shipping package, a tackle store's merchandising display package, and as a safeguarding container, a lure container comprising a vertically elongated concavo-convex rear wall having a rearwardly disposed concave side and a forwardly disposed convex side, that portion of said rear wall above the median horizontal portion being increased gradually in thickness and fashioned into a rigidifying hanger, said last-named portion being provided on a forward surface thereof with a substantially semi-circular keeper groove, a front wall which is relatively flexible and pliant, said front wall having marginal edges thereof superimposed upon and joined to cooperating marginal edges of said rear wall, said front wall having an upper edge fashioned into a free lip which cooperates with the grooved portion of said rear wall in defining an openable and closable mouth, a rearwardly disposed surface of said lip portion having a rigidifying and arcuately curved rib thereon, said rib having inherent tension and transforming the rib into a tensioned tongue, said tongue conforming in length and cross-section with and normally being seated and retained in said groove, said front wall cooperating with the rear wall in defining a pouch for an insertable and removable artificial bait.

2. The container defined in and according to claim 1 and wherein the forward surface of said upper portion of said rear wall is provided with an outstanding flange which overhangs said groove and, in fact, said mouth when said mouth is closed, said flange serving not only to add rigidity but constituting a water deflector.

3. A special article package comprising, in combination, at least one hook-equipped artificial bait, a plug for example, and a complemental container therefor embodying puncture-proof transparent front and back walls having certain marginal edges positively connected in a manner to define a storing pouch in which said bait is pocketed and removably protectively contained, said front wall having an upper edge confronting an upper front surface portion of said back wall and defining an optionally openable and closable mouth, said back wall being molded from self-shape-sustaining plastic, being firm but compliantly resilient, arcuately bowed and accordingly concavo-convex and when manually squeezed by applying finger pressure to opposite lengthwise edges being adapted to be transformed to generally flat form, said front wall being comparably thin, flexible and elastically pliant, constantly tensioned and conformable to the shape imparted to said back wall whether it be normally curvate or, alternatively, flexed by hand to temporarily assume the aforementioned flat form, and said mouth being automatically spread open when said back wall is flexed to assume its flat form.

4. The article containing package defined in and according to claim 3, and means normally closing and maintaining said mouth closed, said means embodying self-contained inherent tension which can be manually actuated at will in a manner to open and hold the mouth open, whereby to facilitate the steps of (1) loading or (2) emptying said bait pocketing pouch.

5. A multipurpose artificial pocket-size packaging, displaying, merchandising and dispensing container for use by anglers comprising: a pouch made of transparent moldable plastics and embodying a vertically elongated back wall, said back wall being permanently bent and bowed between its longitudinal marginal edges and being thus concavo-convex, the resilient self-shape-retaining, restorative properties and inherent responsiveness resulting from the bowed contour providing built-in self-adapting constantly applied tension, a pliant front wall having certain of its marginal edges integrally joined to corresponding marginal edges of said back wall, and having an upper free marginal edge terminating in a plane below and parallel with the corresponding upper edge of said back wall and defining a lip and an optionally openable mouth for the receptacle portion of said pouch, said front wall being resilient and normally taut but expansible when forcibly stretched and expanded, said lip being self-tensioned and providing a self-contained tension held closure for said mouth.

6. The container defined in and according to claim 5, and wherein that surface of said rear wall which confronts and is in alignment with said lip and which constitutes a component of said mouth is provided with said lip, the rearwardly directed surface of said lip having a rib, said rib possessed of inherent resilient tension and conforming in shape and size to a groove and being retentively seatable in said groove in a manner to close said mouth.

References Cited
UNITED STATES PATENTS

| | | | |
|---|---|---|---|
| 1,788,674 | 1/1931 | Hughes | 43—57.5 |
| 2,253,598 | 8/1941 | Africa | 43—57.5 |
| 2,455,079 | 11/1948 | Mercer | 206—6 |
| 2,823,721 | 2/1958 | Svec et al. | 150—3 |
| 2,878,849 | 3/1959 | Lingenfelter et al. | 150—3 |
| 2,984,401 | 5/1961 | Herkender | 206—15.1 |
| 2,857,070 | 10/1958 | Elias | 206—42 |

WILLIAM T. DIXSON, JR., *Primary Examiner.*